(12) United States Patent
Peter

(10) Patent No.: US 7,296,379 B1
(45) Date of Patent: Nov. 20, 2007

(54) CONTAINER SUPPORT SYSTEM WITH SUPPORT DEVICE

(76) Inventor: James A. Peter, 5976 Corlad Rd., Athens, WI (US) 54411

( * ) Notice: Subject to any disclaimer, the term of this patent is extended or adjusted under 35 U.S.C. 154(b) by 211 days.

(21) Appl. No.: 11/116,989

(22) Filed: Apr. 28, 2005

(51) Int. Cl.
*A47G 7/02* (2006.01)
*A01G 9/02* (2006.01)

(52) U.S. Cl. .............................. 47/33; 47/83; 211/88.03

(58) Field of Classification Search ................. 47/39, 47/66.6, 79, 82, 83; 206/423; 248/27.8, 248/175; 211/88.01, 88.03
See application file for complete search history.

(56) References Cited

U.S. PATENT DOCUMENTS

| | | | |
|---|---|---|---|
| 608,590 A | | 8/1898 | Freund |
| 767,175 A | | 8/1904 | Sibole |
| 866,449 A | | 9/1907 | Feist |
| 923,663 A | | 8/1909 | Kroeger |
| 1,527,856 A | * | 2/1925 | France ...................... 47/41.11 |
| 2,483,719 A | | 3/1949 | Schackett et al. |
| 2,492,152 A | * | 12/1949 | Hollowell ....................... 47/80 |
| 2,741,875 A | | 4/1956 | Van Staalduinen |
| 3,284,039 A | * | 11/1966 | Brunner ...................... 248/153 |
| 3,339,310 A | | 9/1967 | Solomon |
| 4,014,506 A | * | 3/1977 | Hanson ................... 248/312.1 |
| 4,223,480 A | | 9/1980 | Welty |
| 4,646,209 A | * | 2/1987 | Jansen ........................ 362/122 |
| 4,852,760 A | * | 8/1989 | Sarnoff et al. ............... 220/743 |
| 5,029,721 A | * | 7/1991 | Timpe ......................... 220/769 |
| 5,094,060 A | * | 3/1992 | Caird ........................... 53/390 |
| 5,103,587 A | | 4/1992 | Holler |
| 5,269,094 A | * | 12/1993 | Wolverton et al. ........... 47/66.6 |
| 5,390,443 A | * | 2/1995 | Emalfarb et al. .............. 47/67 |
| 5,503,062 A | * | 4/1996 | Buff, IV ...................... 99/426 |
| D398,663 S | * | 9/1998 | Freelander ................. D21/532 |
| 6,119,393 A | * | 9/2000 | Wourms et al. ................ 47/39 |
| D442,422 S | * | 5/2001 | Dabney ....................... D7/337 |
| 6,412,740 B1 | * | 7/2002 | Rush et al. ............... 248/312.1 |
| 6,637,156 B2 | | 10/2003 | Stewart |
| 6,901,700 B2 | * | 6/2005 | Trabka .......................... 47/86 |
| 7,069,691 B2 | * | 7/2006 | Brooke et al. .............. 47/59 R |

FOREIGN PATENT DOCUMENTS

JP 08019332 A * 1/1996

* cited by examiner

*Primary Examiner*—Jeffrey L. Gellner
(74) *Attorney, Agent, or Firm*—Andrus, Sceales, Starke & Sawall, LLP

(57) ABSTRACT

A support rack is interposed between a first open top container and a second open top container for supporting the second open top container within the first open top container. The support rack includes a base underlying a bottom wall of the second open top container and having a central region and a periphery, and a series of spaced apart support structures joined to the base. Each support structure is provided with a first portion connected to the base and extending along the base from a central region to beyond a periphery. The first portion supports the bottom wall of the second open top container. A second portion diverges upwardly and outwardly from the first portion and a third portion is secured to and extends outwardly from the second portion. The third portion defines a handle supported upon and extended outwardly of the upper edge of the first open top container. The handle is adapted to be easily grasped by one's entire hand.

6 Claims, 6 Drawing Sheets

CONTAINER SUPPORT SYSTEM WITH SUPPORT DEVICE

FIELD OF THE INVENTION

The present invention relates generally to a system for supporting a smaller container within a larger container and, more particularly, pertains to a container support system employing a support device which provides support from the bottom wall of the smaller container and enables enhanced portability thereof.

BACKGROUND OF THE INVENTION

Many people today choose to decorate their properties by displaying various plant and flower arrangements in large open top decorative containers commonly known as "whiskey barrel" containers which are widely available in most home and garden stores. Such large containers are typically fabricated from a number of wooden members encircled by metal straps, and have an upper diameter of about 25 inches and a height of about 16 inches. When filled with soil and foliage, the whiskey barrels can weigh approximately 125 pounds which can make them difficult to move.

As a result, it is desirable to provide an alternative way of displaying floral and other arrangements from large ground-based containers such as whiskey barrels without having to fill the large container with soil or other filler. That is, there exists a need for supporting a smaller, relatively wide based container capable of holding such arrangements from the open top of the larger container in a manner which will improve installation, maintenance and removal of a display arrangement.

SUMMARY OF THE INVENTION

It is a general object of the present invention to provide a container support system for supporting a smaller, filled open top container within a larger open top container.

It is also an object of the present invention to provide a support device for supporting a smaller, filled container within a larger open top container wherein substantially the entire bottom wall of the smaller container is supported.

It is another object of the present invention to provide a support device for supporting a smaller filled container within a larger open top container such that the portability of the smaller container is improved.

It is a further object of the present invention to provide a container support device fabricated from a resilient material which will self-adjust in response to expansion and contraction of the larger container.

It is an additional object of the present invention to provide a support device in the form of a smaller container having handles integrally formed thereon for supportive engagement on the upper edge of a larger container.

In one aspect of the invention, a container support system includes a first open top container having an outer, upper edge. The first open top container is adapted to rest upon a support surface. A second open top container has a bottom wall and a continuous sidewall extending upwardly from the bottom wall. The second open top container has an interior surface adapted to be filled by a substance. A support rack is interposed between the first open top container and the second open top container for supporting the second open top container within the first open top container. The support rack includes a base underlying the bottom wall of the second open top container and having a central region and a periphery, and a series of spaced apart support structures joined to the base. Each support structure is provided with a first portion connected to the base and extends along the base from the central region to beyond the periphery thereof. The first portion supports the bottom wall of the second open top container. A second portion diverges upwardly and outwardly from the first portion. A third portion is secured to and extends outwardly from the second portion, and defines a handle supported upon and extending outwardly of the upper edge of the first open top container, the handle being adapted to be easily grasped by one's entire hand.

In another aspect of the invention, a container support system is adapted for displaying flowers and plants. The system includes a first open top container having an outer, upper edge, the first open top container being adapted to rest upon a support surface. A second open top container is sized smaller than the first open top container and has a bottom wall and a continuous sidewall extending upwardly from the bottom wall. The second open top container has an interior surface adapted to be filled by flowers and plants. A resilient support rack is interposed between the first and second open top containers for supporting the second open top container within the first open top container. The support rack includes an arrangement of concentric rings connected together by a series of equally spaced apart support structures. Each support structure is formed by a pair of parallel wire rods joined to the concentric rings and extending radially from an innermost concentric ring to an outermost concentric ring. A second pair of parallel wire rods diverges upwardly and outwardly from the first pair of wire rods. A curved wire rod handle interconnects top ends of the second pair of wire rods. The handle is supported from and extends outwardly of the upper edge of the first open top container wherein the first pairs of wire rods engage and support the bottom wall of the second open top container.

The concentric rings further support the bottom wall of the second open top container. The handle has a semi-circular configuration. The arrangement of the concentric rings includes an intermediate concentric ring between the innermost and outermost concentric rings. The first pairs of wire rods have outer ends extending beyond the periphery of the outermost concentric ring. The sidewall of the second open top container has an upper edge lying above the curved handle when the second open top container is supported by the support rack.

In another aspect of the invention, a container support device is adapted to be interposed between first and second open top containers for supporting the second open top container within the first open top container. The support device includes a resilient wire support rack including an arrangement of concentric rings connected together by a series of equally spaced apart support structures. Each support structure is formed by a first pair of parallel wire rods joined to the concentric rings and extending radially from an innermost concentric ring to an outermost concentric ring. A second pair of parallel wire rods diverges upwardly and outwardly from the first pair of wire rods. A curved wire rod handle interconnects top ends of the second pair of wire rods. The handle is adapted to be supported from and extends outwardly from an upper edge of the first open top container wherein the first pairs of wire rods are adapted to support and engage a bottom wall of the second open top container. The arrangement of concentric rings includes an intermediate concentric ring positioned between the innermost and outermost concentric rings. The series of support structures includes two pairs of diametrically opposed, identical support structures. The first pair of wire rods overlies the concentric rings.

Various other features, objects and advantages of the invention will be made apparent in the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
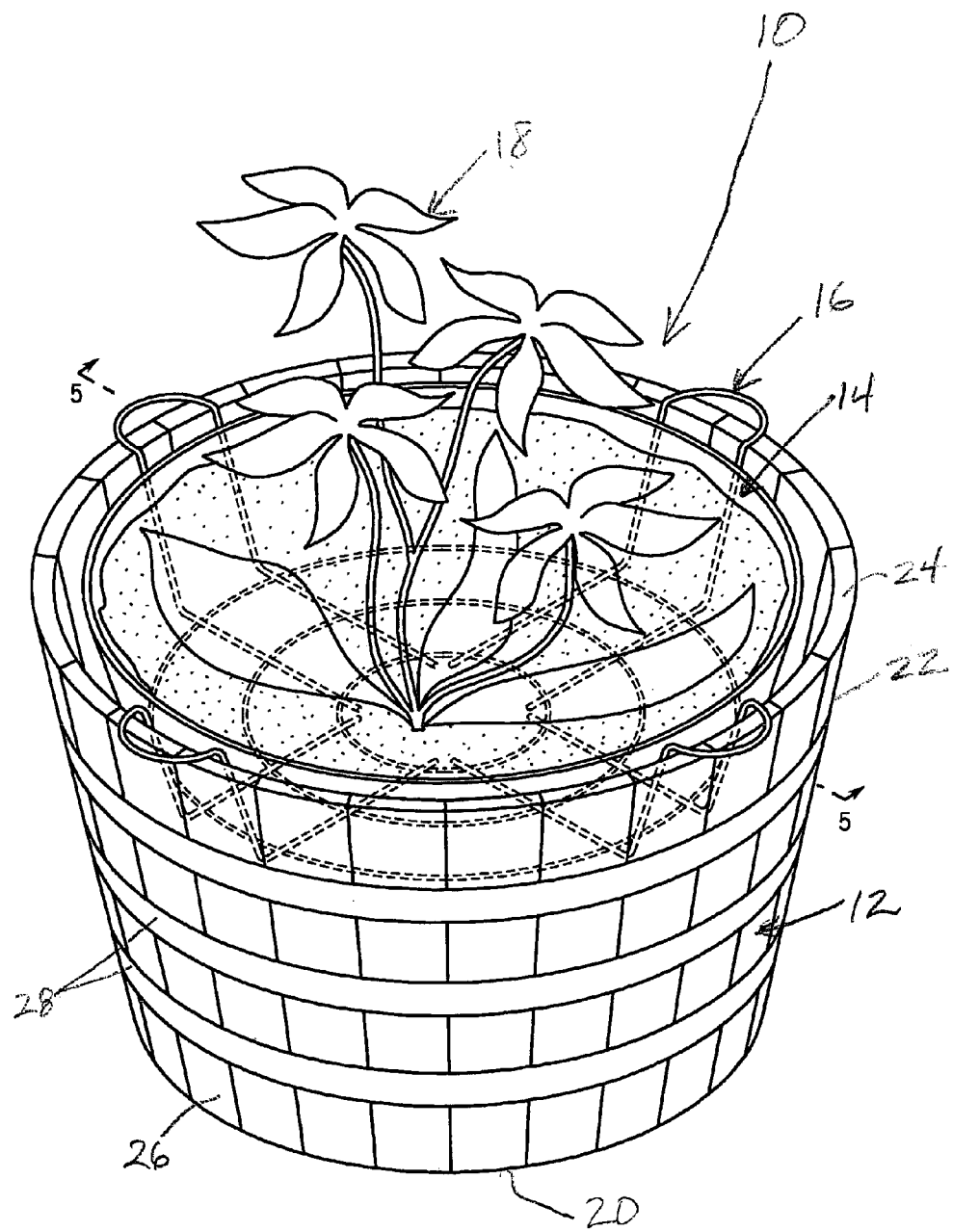
FIG. 1 is a perspective view of an assembled container support system embodying the present invention.
Figure 2:
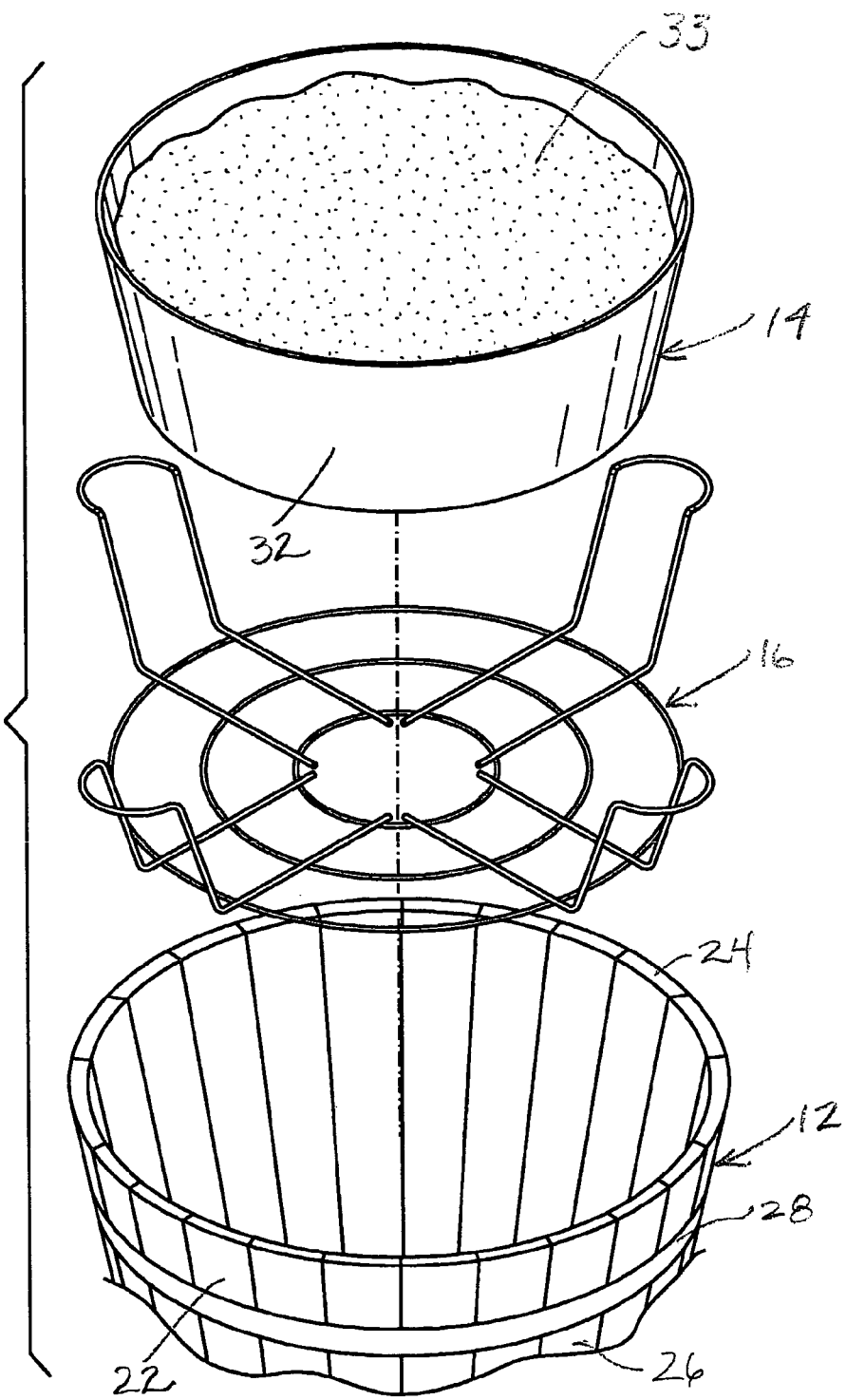
FIG. 2 is an exploded, perspective view of the components of the container support system of FIG. 1.
Figure 3:
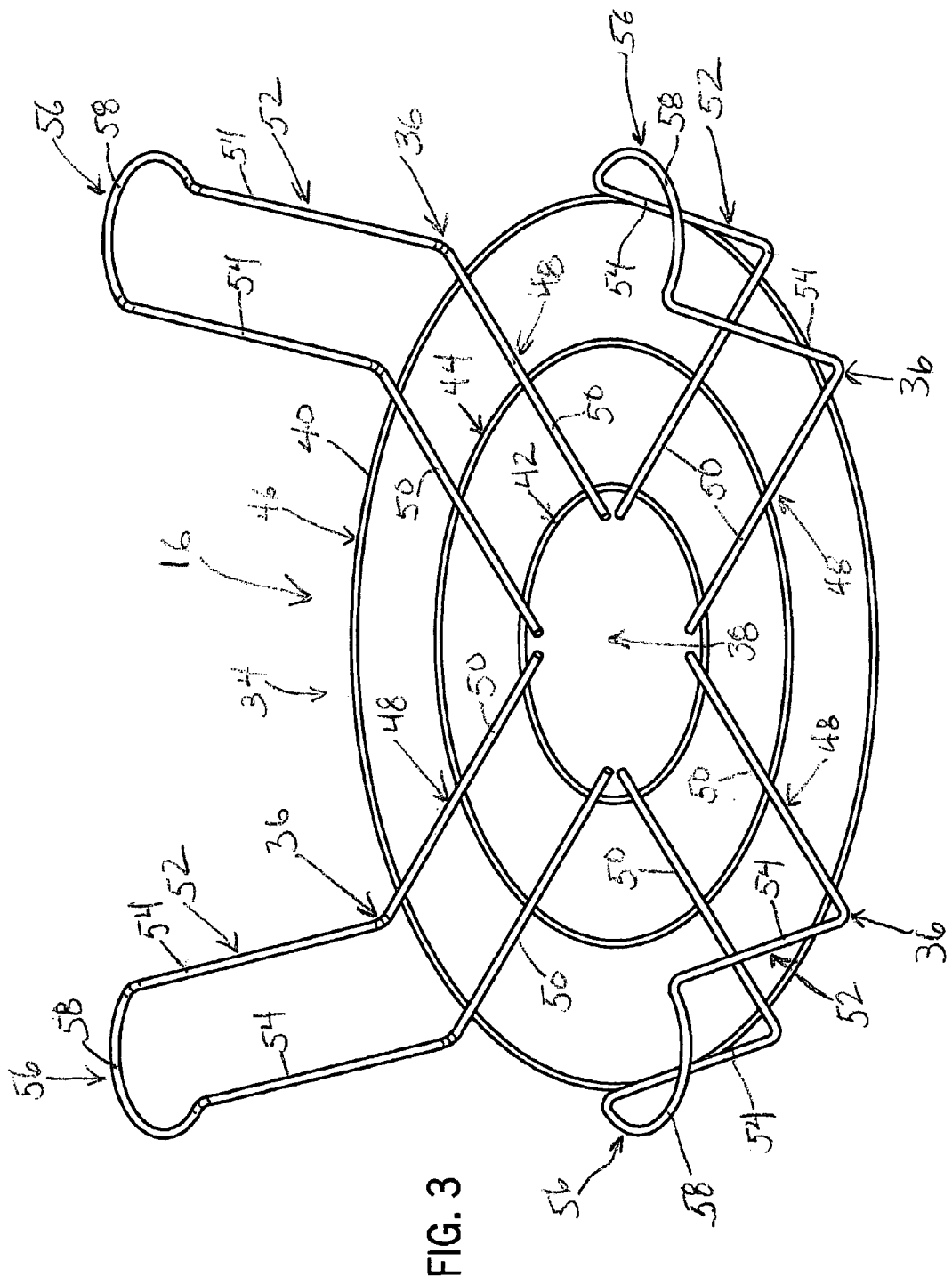
FIG. 3 is a perspective view of a support device used in the system of FIG. 1.
Figure 4:
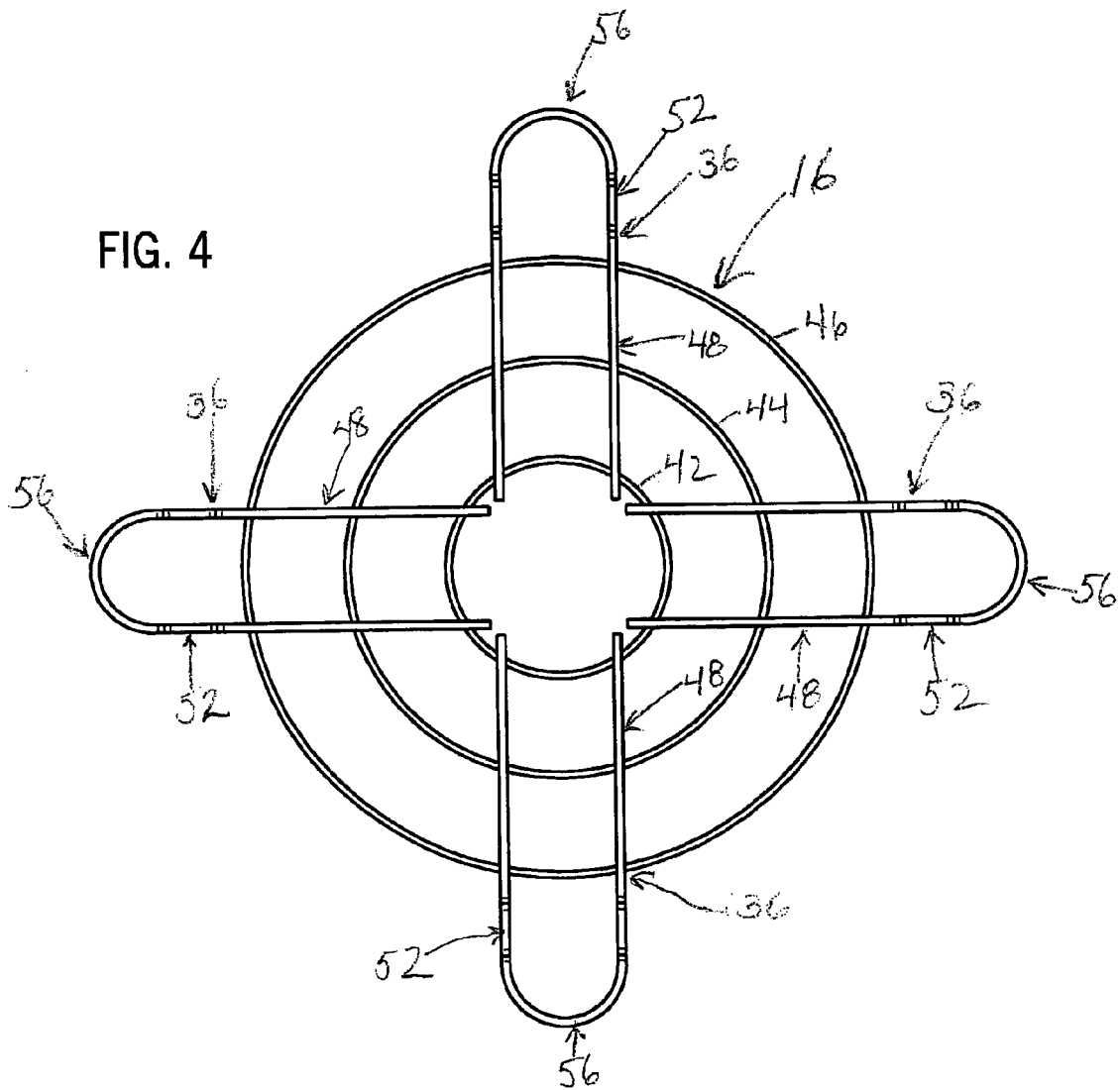
FIG. 4 is a top view of the support device.
Figure 5:
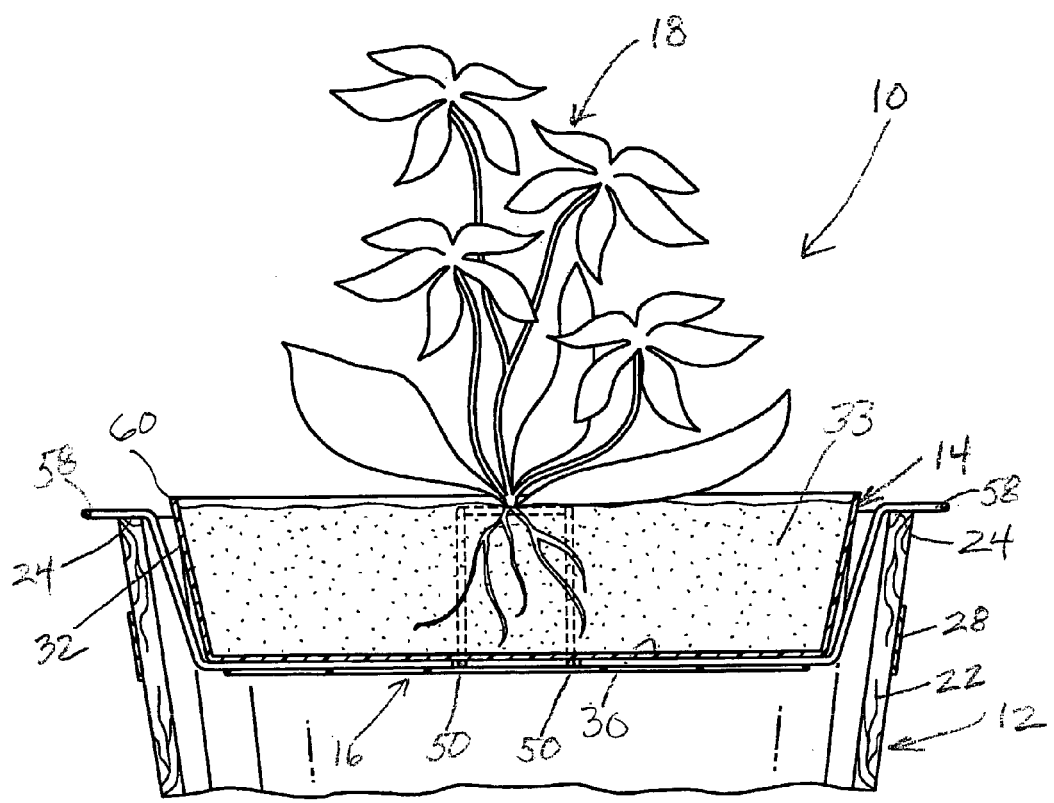
FIG. 5 is a sectional view of the assembled container support system taken on line 5-5 of FIG. 1.

Referring now to the drawings, FIGS. 1-5 illustrate various components of a container support system 10 comprised of a first open top container 12, a second smaller open top container 14 and a support device 16 interposed between the containers 12, 14 for conveniently and efficiently supporting the second container 14 within the first container 12.

In the preferred embodiment to be described, the support system 10 is particularly useful in supporting a natural or artificial flower and/or plant arrangement 18. However, it should be appreciated that other solid or fluid substances may be supported, displayed and, if desired, more easily transported in the second open top container 14 of the container support system 10.

The first open top container 12 is a rigid vessel having a bottom wall 20 and a continuous upwardly flaring sidewall 22 terminating in an outer upper edge 24. In the preferred embodiment, the first container 12 is shown in the form of a commercially available wooden container 26 surrounded by metal straps 28 and known as a whiskey barrel. The first container may take other forms and be comprised of other suitable strong, rigid and weather resistant materials.

The second open top container 14 is a semi-rigid construction designed to be supported within the upper interior space of the larger first open top container 12. The second container 14 is fabricated preferably of a recycled high-density polyethylene plastic and includes a circular bottom wall 30 and a continuous upwardly diverging sidewall 32. The sidewall 32 forms an interior surface which is adapted to be filled as desired by a substance 33 such as soil, sand, styrofoam, water, etc. and, as above noted, flowers and plants. The second container 14 may also be manufactured of other lightweight but extremely durable, weather impervious materials in addition to plastic.

The support device 16 is composed of a flexible or resilient, cylindrical wire rod rack having a base 34 and a series of four equally spaced apart support structures 36 joined to the base 34 and organized in two diametrically opposed pairs. The base 34 has a central region 38 and a periphery 40, and is comprised of an innermost ring 42, an intermediate ring 44 and an outermost ring 46, all of which are concentric with each other. Each support structure 36 is identical in size and shape and is formed integrally with three distinct portions. A first portion 48 is connected to the base 34 and runs generally horizontally along the base 34 from the central region 38 to beyond the periphery 40 of the base 34. More particularly, the first portion 48 includes a first pair of parallel wire rods 50 joined to and overlying concentric rings 42, 44, 46, and extending radially from inside the innermost ring 42 to beyond the outermost ring 46. A second portion 52 is formed by a second pair of parallel wire rods 54 extending from the outermost ends of the first pair of wire rods 50. The second pair of wire rods 54 diverges or angles upwardly and outwardly from the first pair of wire rods 50. A third portion 56 is defined by a curved, semi-circular handle 58 which interconnects top ends of the second pair of wire rods 54 and extends outwardly therefrom. The handles 58 are suitably sized so that one may grasp its surface with their entire hand, if desired.

In use, the second open top container 14 is positioned on the support device 16 such that the entire bottom wall 30 of the container 14 is engaged directly with and supported upon the first pairs of wire rods 50 of the support structures 36 with additional support from the base 34. The sidewall 32 of the second container 14 lies inwardly of the second pairs of wire rods 54 with an upper edge 60 of the container 14 lying an at elevation slightly above the handles 58. With the second container 14 supported by the support device 16, one pair of opposed handles 58 are grasped to place a bottom portion of the handles 58 into supporting engagement with the upper edge 24 of the empty first open top container 12. Curved portions of the handles 58 project outwardly of the upper edge 24 so that the support device 16 can be easily installed or removed relative to the first container 12. The second container 14 may be filled, such as with soil 33, flowers and/or plants 18, either before or after the support device 16 is engaged with the upper edge 24 of the first container 12. When used to display natural flowers and plants which require regular irrigation, the first container 12 may be provided, if desired, with drainage holes near the bottom wall 20 of the container 12.

Figure 6:
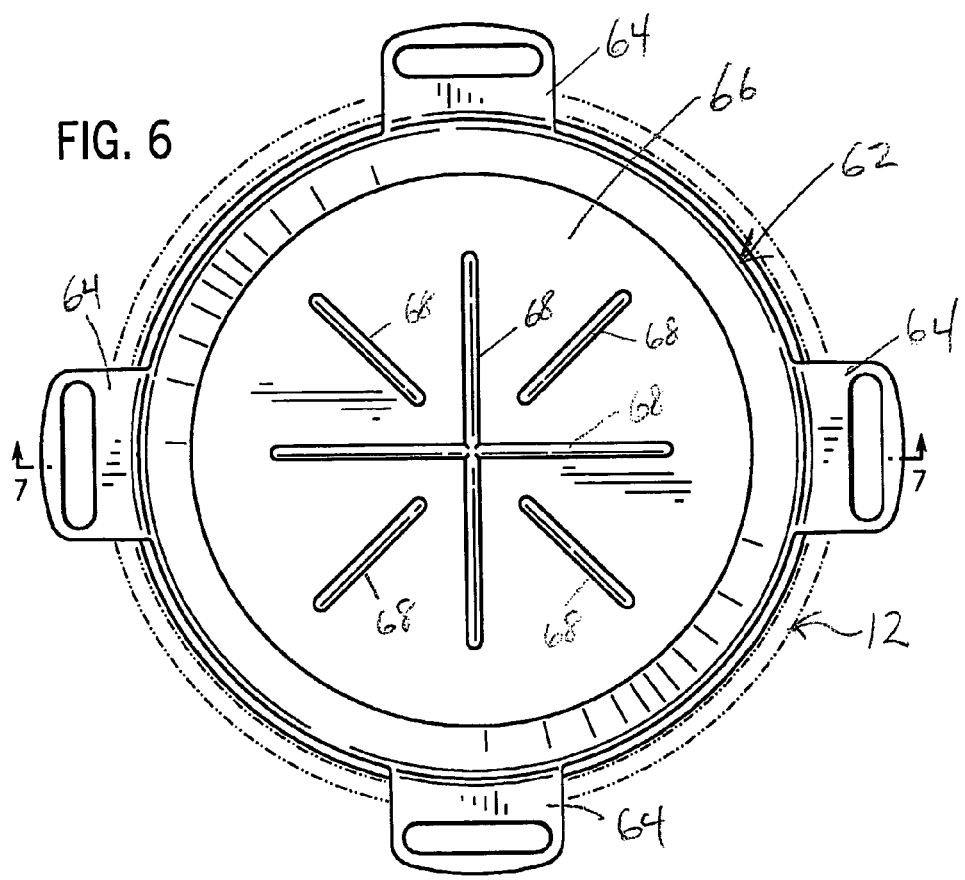
FIGS. 6 and 7 are top and sectional views, respectively, of a combined container and support device alternatively used in the container support system, the sectional view taken on line 7-7 of FIG. 6.
Figure 7:
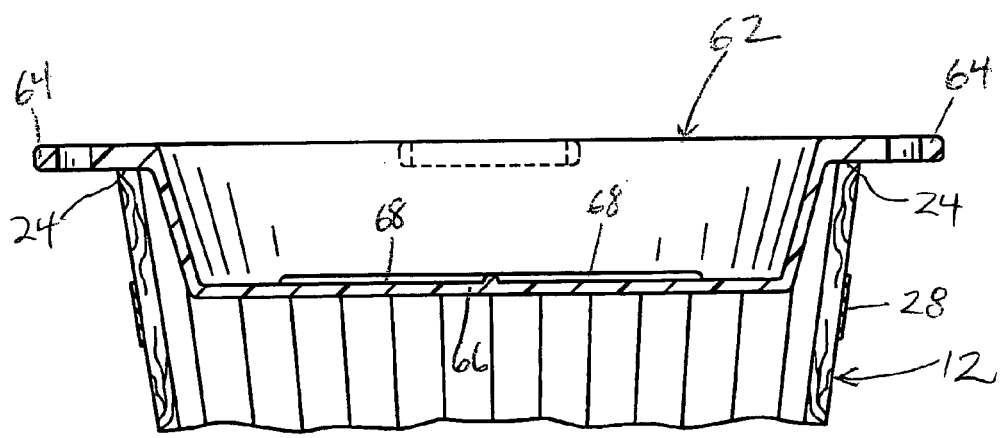

In an alternative embodiment shown in FIGS. 6 and 7, the second container 14 and the support device 16 are combined into a second container 62 having outwardly extending handles 64 which are supported and engaged on the upper edge 24 of the first container 12. The second container 62 has a bottom wall 66 reinforced by radial ribs 68.

It should be appreciated that the invention provides a lightweight yet extremely durable support device 16 for supporting a smaller container 14 filled with flowers and plants or the like within a larger supporting container 12 in a manner which supports the entire bottom wall 30 of the smaller container 14, and provides for enhanced portability of the smaller container 14. In the preferred embodiment, the second container 14 requires a greatly decreased fill capacity compared to the first container 12 enabling simplified setup and replacement of the particular display in the second container 14. Each curved handle 58 not only permits for proper balanced support of the filled second container, but provides a gripping surface engageable with one's entire hands when installing or removing the second container 14. The resiliency of the wire rod support device 16 allows for a self-adjusting support should the wooden first container 12 expand or contract due to changing environmental conditions.

The support device 16 enables the filled second container 14 to be more easily transported inside for frost or inclement weather, or for the transfer of perennials during winter. When breaking down multiple container systems 10 for winter, the support devices 16 may be conveniently stacked for storage. Besides displaying natural flowers and plants, the second container 14 may be filled with plastic winter foliage in soil or styrofoam. The second container 14 may also be provided with a sand-based display or may be filled with water and used as a birdbath.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. A container support system comprising:
a first open top empty container having an outer, upper edge, the first open top container adapted to rest upon a support surface;
a second open top container having a bottom wall and a continuous sidewall with an upper edge extending upwardly from the bottom wall, the second open top container having an interior surface filled by a substance; and
a support rack interposed between the first open top container and the second open top container for continuously supporting the filled second open top container within the empty first open top container, the support rack including a base formed by multiple concentric rings underlying the bottom wall of the second open top container and having a central open region and a periphery, and a series of spaced-apart, bent U-shaped support structures joined to the base, each support structure being provided with a first portion connected to the base and extending along and above the base from the central region to beyond the periphery thereof, the first portion supporting the bottom wall of the second open top container, a second portion diverging upwardly and outwardly from the first portion and a third portion secured to and extending outwardly from the second portion, and defining a semi-circular shaped handle supported upon and extending horizontally outwardly of the upper edge of the first open top container substantially parallel to a plane of the base, the handle being adapted to be easily grasped by one's entire hand;
wherein the sidewall of the filled second open top container is spaced inwardly of each second portion, and the upper edge of the filled second open top container lies above each handle when the second open top container is supported by the support rack, and
wherein the handles are arranged in directly opposed pairs enabling balanced support and transfer of the filled second open top container relative to the empty first open top container.

2. The support system of claim 1, wherein the base and the first portions underlie the entire bottom wall of the second open top container.

3. A container support system for displaying flowers and plants comprising:
a first open top empty container having an outer, upper edge, the first open top container adapted to rest upon a support surface;
a second open top container sized smaller than the first open top container and having a bottom wall and a continuous sidewall with an upper edge extending upwardly from the bottom wall, the second open top container having an interior surface filled by flowers and plants; and
a resilient support rack interposed between the first and second open top containers for continuously supporting the filled second open top container within the empty first open top container, the support rack including an arrangement of concentric rings connected together by a series of four equally spaced-apart, bent U-shaped support structures, each support structure being formed by a first pair of parallel wire rods joined to and above the concentric rings and extending radially from an innermost concentric ring to an outermost concentric ring, a second pair of parallel wire rods diverging upwardly and outwardly from the first pair of wire rods and a curved, semi-circular wire rod handle interconnecting top ends of the second pair of wire rods, the handle being supported from an extending horizontally outwardly of the upper edge of the first open top container substantially parallel to a plane of the concentric rings wherein the first pairs of wire rods engage and support the bottom wall of the second open top container, and
wherein the sidewall of the filled second open top container is spaced inwardly from the second pairs of parallel wire rods, and the upper edge of the filled second open top container lies above each handle when the second open top container is supported by the support rack, and
wherein the handles are arranged in directly opposed pairs enabling balanced support and transfer of the filled second open top container relative to the empty first open top container.

4. The support system of claim 3, wherein the concentric rings further support the bottom wall of the second open top container.

5. The support system of claim 3, wherein the arrangement of concentric rings includes an intermediate concentric ring between the innermost and outermost concentric rings.

6. The support system of claim 3, wherein the first pairs of wire rods have outer ends extending beyond the periphery of the outermost concentric ring.

* * * * *